(12) United States Patent
Morel

(10) Patent No.: US 8,190,442 B2
(45) Date of Patent: May 29, 2012

(54) METHOD AND APPARATUS FOR CONTENT RECOMMENDATION

(75) Inventor: Anthony Morel, Shanghai (CN)

(73) Assignee: Pace Plc, West Yorkshire (GB)

(*) Notice: Subject to any disclaimer, the term of this patent is extended or adjusted under 35 U.S.C. 154(b) by 814 days.

(21) Appl. No.: 10/596,703

(22) PCT Filed: Dec. 10, 2004

(86) PCT No.: PCT/IB2004/052755
§ 371 (c)(1),
(2), (4) Date: Jun. 22, 2006

(87) PCT Pub. No.: WO2005/067295
PCT Pub. Date: Jul. 21, 2005

(65) Prior Publication Data
US 2009/0018845 A1    Jan. 15, 2009

(30) Foreign Application Priority Data
Dec. 29, 2003    (CN) .......................... 2003 1 1245239

(51) Int. Cl.
*G06Q 10/00* (2012.01)
(52) U.S. Cl. ...................................... 705/1.1
(58) Field of Classification Search ............... 705/1, 319
See application file for complete search history.

(56) References Cited

U.S. PATENT DOCUMENTS

| | | | | |
|---|---|---|---|---|
| 6,029,195 | A * | 2/2000 | Herz | 725/116 |
| 6,266,649 | B1 * | 7/2001 | Linden et al. | 705/26 |
| 2003/0051240 | A1 | 3/2003 | Schaffer et al. | |
| 2003/0093580 | A1 * | 5/2003 | Thomas et al. | 709/318 |
| 2003/0237087 | A1 | 12/2003 | Kurapati et al. | |

FOREIGN PATENT DOCUMENTS

| | | |
|---|---|---|
| EP | 0742669 | 11/1996 |
| GB | 2387676 A | 10/2003 |
| WO | WO02/11445 A2 | 2/2002 |

(Continued)

OTHER PUBLICATIONS

Zaslow, Jeffry. "If TiVo Considers You Gay, Here is How to Set Record Straight: With Low Profile—Digital Recorders Video Selections for Its Users Can Give Them Pause". Wall Street Journal. (Europe). Brussels: Nov. 28, 2002. p. A.1.*

(Continued)

*Primary Examiner* — Gabrielle McCormick
(74) *Attorney, Agent, or Firm* — Grady K. Bergen; Griggs Bergen LLP

(57) ABSTRACT

The present invention relates to a method and an apparatus for recommending content and updating user proprofile. The method adds a step of content alarm processing before recommending to user on a basis of the current content recommending method, so that the recommendation, which can be offered directly to a user in a previous time must be processed correspondingly in a manner of the content alarm before being sent to the user. Alternatively, after receiving an user's feedback information, the method and the system processes the feedback information correspondingly in a manner of the content alarm and updates the user profile according to the feedback information processed in the manner of the content alarm. The invention can recommend contents more carefully and accurately, making the recommendation conforming further to the user's requirement so as to avoid as far as possible the recommendation of unwished program to users.

4 Claims, 6 Drawing Sheets

FOREIGN PATENT DOCUMENTS

| | | |
|---|---|---|
| WO | WO02/42959 A2 | 5/2002 |
| WO | WO02/47381 A2 | 6/2002 |

OTHER PUBLICATIONS

TV-Anytime: "Specification Seris : S-3—Metadata—SP003v1.1" SPECS, Aug. 17, 2001, XP002205700.

Evain J-P: "TV-Anytime A preliminary specification on schedule!" EBU Review Technical, European Broadcasting Union, Geneva, CH, Sep. 2000, pp. 1-14, XP002279571 ISSN: 1018-7391.

Yu Z et al: "TV3P: An Adaptive Assistant for Personalized TV" IEEE Transactions on Consumer Electronics, IEEE Inc. New York, US, vol. 50, No. 1, Feb. 2004, pp. 393-399, XP001198155 ISSN: 0098-3063.

Kaushal Kurapati et al: "A Multi-Agent TV Recommender" Workshop on Personalization in Future TV, XX; XX, Jul. 13, 2001, pp. 1-8, XP002228385.

Cotter P et al: "PTV: Intelligent Personalised TV Guides" Proceedings of the National Conference on Artificial Intelligence and the Innovative Applications of Artificial Intelligence Conference, XX, XX, Jul. 30, 2000, pp. 957-964, XP008020497.

Ehrmantraut M et al: "The Personal Electronic Program Guide—Towards the Pre-Selection of Idividual TV Programs" Proceedings of the International Conference on Information and Knowledge Management CIKM, ACM, New York, NY, US, Nov. 12, 1996, pp. 243-250, XP002071337.

Zhou Xinghe et al: "A multi-agent system for personalized and private service in PDR" Information Technology: Coding and Computing [Computers and Communications], 2003. Proceedings. ITCC 2003. International Conference on Apr. 28-30, 2003, Piscataway, NJ, USA,IEEE, Apr. 28, 2003, pp. 635-639, XP010638694 ISBN: 0-7695-1916-4.

\* cited by examiner

METHOD AND APPARATUS FOR CONTENT RECOMMENDATION

BACKGROUND ART

The present invention relates to a method and apparatus for content recommendation, and particularly relates to a method and apparatus for recommending content cautiously.

With the development of modern communication technology, people can acquire a large amount of information at any moment. When people face too much information for selection, they are in urgent need of a tool that can help them to rapidly find a content, in which they are really interested, i.e. a personalized content recommendation system. At present, various kinds of content recommendation systems have already been applied to television, broadcast and Internet field extensively.

FIG. 1 is a block diagram of a system for recommending content in the prior art, the system comprising: an information receiving means 160 for receiving information; a user profile storage means 110 for storing the user's favor characteristics; a matching means 120 for comparing the user's favor characteristics with the received information to calculate and obtain the degree of user's interest in the information, the degree of interest is a numerical value; a sieving means 130 for selecting the information in which the user is interested based on the calculated degree of interest and recommending the information to the user; a user interactive means 140 for interchanging information between the user and the recommendation system, the user may select the recommended information by means of the interactive means for viewing, skip the information that does not require for viewing and give other feedback to alter his/her own user profile; and a user profile modifying means 150 for updating the user profile according to the user's feedback information.

However, the current recommendation method has some disadvantages. If a user has a definite request for a gay movie, the corresponding user profile will be updated. After that, the recommendation system will always recommend to the user too many gay movies and bring a big trouble to the user.

In order to get rid of the unnecessary troubles mentioned above, the user may alter recommendation by requesting to view other programs, for example, war movies. However, a problem that the recommendation system will recommend too many programs of war movies arises immediately.

For example, according to the report of Wall Street magazine, the recommendation system of a user always recommends to him the programs about gay, as a try he uses war movies to alter recommendation made by the recommendation system, unfortunately the recommendation system asserts that he is a crazy guy about reminiscing the Third Reich and keeps on recommending to him the movies about the Third Reich.

Thus, it can be seen that an error of content recommendation brings the user a lot of trouble, especially in the case of recommending the programs related to sensitive contents like violence, sex, and so on. Therefore, a more cautious and accurate recommendation system is needed.

Contents of the Invention

One of the objects of the invention is to set forth a new method for recommending content in order to overcome the defects existing in the prior recommendation system mentioned above and recommend some sensitive contents to the user more cautiously and accurately, the method comprising: first, receiving content information which includes particular information characteristic, the information characteristic including the content characteristic and the program specific information, wherein the program specific information could be the key word in synopsis; next, matching the content information with a user profile; then, performing a corresponding content alert processing on the matched result according to the information characteristic; and finally, recommending corresponding information to the user according to the result that is obtained after content alert processing.

Below is the procedure of the content alert processing: obtaining corresponding alert characteristic from the information characteristic; obtaining a comprehensive alert level of the content information according to the alert characteristic; and processing the matched result correspondingly according to the comprehensive alert level, wherein the alert characteristic including at least one of the followings: age, sex, violence, vulgarity, discrimination and drug.

The comprehensive alert level is obtained in this way: first, obtaining the parameter of the alert characteristic; comparing the parameter with a corresponding predetermined threshold to obtain the corresponding alert level; then processing the alert level to obtain the comprehensive alert level.

Since the present recommendation method adds a step of content alert processing after matching the content information with the user profile and before recommending the program, this method is more cautious to the recommendation of sensitive content and avoids recommending those contents that are not expected by the user.

Another object of the invention is to set forth a new method for updating the user profile in order to get rid of the defects in the recommendation system mentioned above and recommend to the user some sensitive contents more cautiously and accurately. The method comprising: first, obtaining information characteristic of content information and obtaining feedback information of the content information from the user, performing corresponding content alert processing on the feedback information according to the information characteristic; and updating the user profile according to the processed feedback information.

During the procedure of updating the user profile, corresponding content alert processing on the feedback information is performed before the feedback information is used to update the user profile, so that the feedback information can reflect the user's requirement more cautiously. This recommendation system will not bring unnecessary influence to the user profile and then recommend to the user the unfavorable contents due to the user's occasional behavior.

With reference to the following description made in combination with drawings and the claims, other objects and achievements of the invention will be obvious and a more comprehensive understanding of the invention can be obtained.

DESCRIPTION OF FIGURES

With reference to the drawings, the present invention gives detailed explanation through embodiments, wherein.

In all the drawings, the same reference numerals represents the similar or same feature and function. With reference to the drawings, further explanation of the invention is made as follows in combination with the embodiments.

MODE OF CARRYING OUT THE INVENTION

Figure 1:
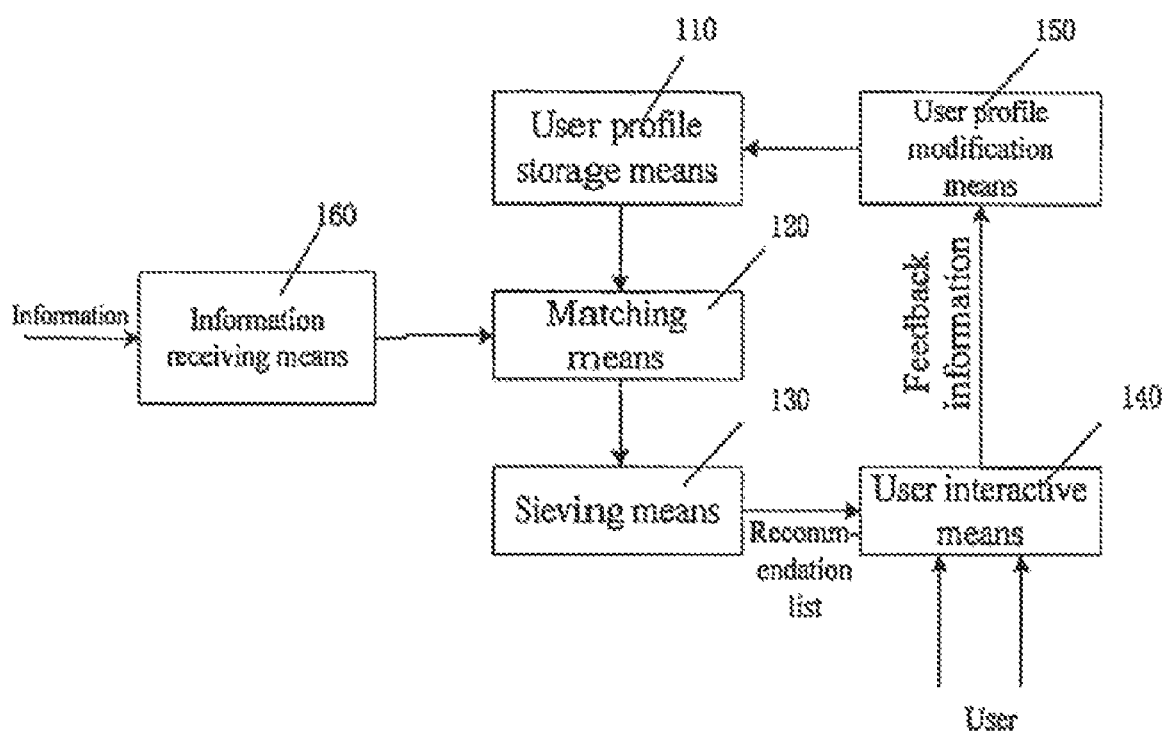
FIG. 1 is a structural diagram of the prior content recommendation system.
Figure 2:
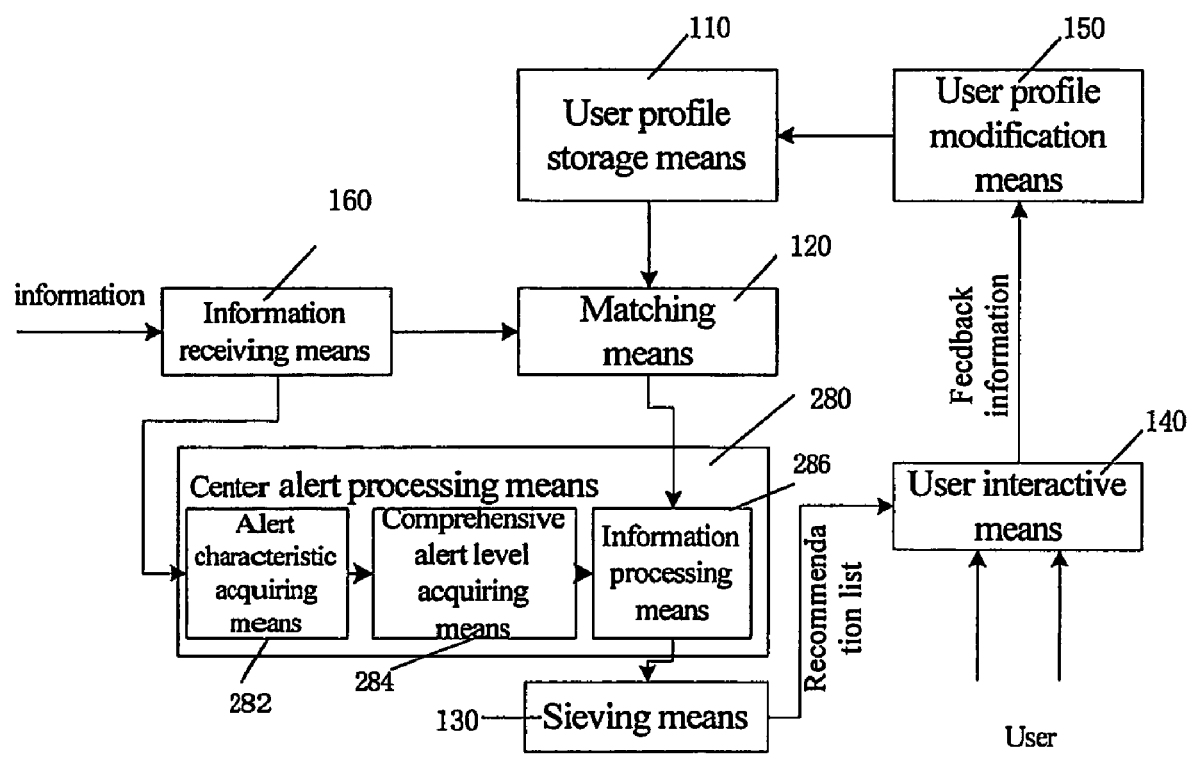
FIG. 2 is a structural diagram of the content recommendation system according an embodiment of the invention.

FIG. 2 is a structural diagram of the content recommendation system according an example of the invention. This recommendation system includes an information receiving means 160, a matching means 120, a content alert processing means 280 and a sieving means 130.

The information receiving means 160 is used for receiving information from outside, the information comes from broadcast, television station or Internet, etc., for example, a digital television electronic program guide. The information comprises specific information characteristics consisting of content characteristics and program specific information. The program specific information can be the key words in the program synopsis.

The matching means 120 is used for matching the content information with a user profile to obtain a matching result. Specifically, a similarity match is performed between the specific information characteristics of the content information and the favor characteristics in the user profile to obtain the user's comprehensive interest degree of the specific information characteristics.

The content alert processing means 280 is used for performing corresponding content alert processing to the matching result according to the information characteristics, the means comprising: an alert characteristic obtaining means 282 for obtaining corresponding alert characteristics from the information characteristics; a comprehensive alert level obtaining means 284 for obtaining a comprehensive alert level of the content information according to the alert characteristic; and an information processing means 286 for correspondingly processing the matching result according to the comprehensive alert level.

The sieving means 130 is used for recommending to the user the information having been undergone with the content alert processing. The sieving means 130 sieves, through a set threshold value, the information in which the user is interested from the information that have been undergone with content alert processing, arranges the sieved information in order according to the interest degree and then generates a recommendation list for the user.

The content recommendation system further includes a user profile storage means 110 for storing the user's favor characteristics.

The content recommendation system further includes a user interactive means 140 for interchanging information between the user and the recommendation system, the user may select the recommendation information for viewing by means of the interactive means, skip the information in which the user is not interested and give other feedback information to update the user profile.

The content recommendation system further includes a user profile modifying means 150 for dynamically updating the user profile according to the user's feedback information. For example, the actual user's interest degree of the recommendation information is determined according to a ratio between the time on which the user views the recommendation information and the predetermined time required for playing the information, thereby updating user parameters.

Figure 3:
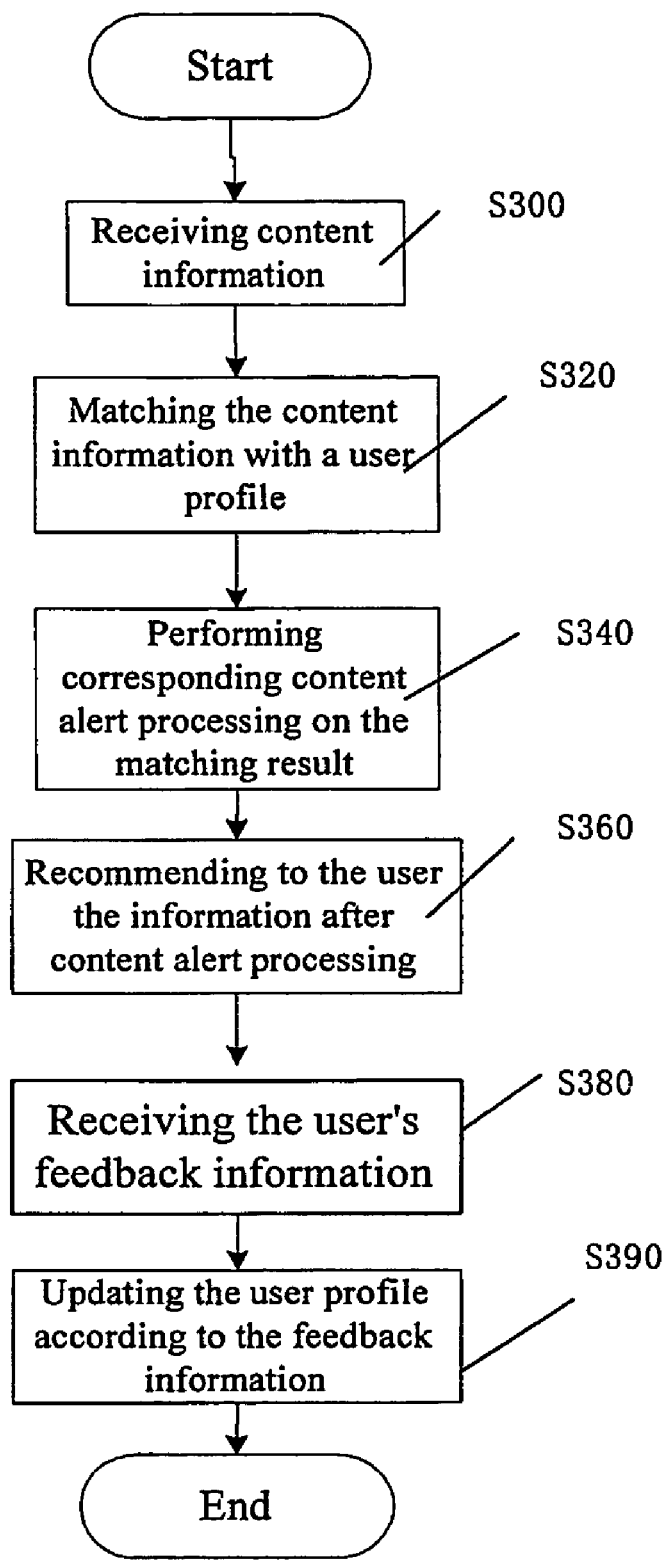
FIG. 3 is a flow chart of the content recommendation method according an embodiment of the invention.

FIG. 3 is a flow chart of the content recommendation method according to an embodiment of the invention.

First, the content information is received (step S300). For example, the content information is a metadata of a television program from digital television program guide, the metadata contains a lot of specific information characteristics, for example, type, language, actor, keyword . . . , a program can be represented as a vector formed by n items of specific information characteristics, that is $$C=(u_1, \ldots, u_n) \quad (1)$$

wherein $u_i$ is the weighted value of specific information characteristic "term" $t_i$, the weighted value is taken following such a rule: if "term" $t_i$ belongs to key information of the program metadata, then $u_i=1$, otherwise $u_1=0$. Supposing the metadata of a movie "Silent Lamb" is received, and this movie has four information characteristics which are "movie", "war", "violence" and "sex" respectively. Since "movie", "violence" and "sex" are key information of the program metadata, their weighted value is 1, and "war" is not the key information of the program metadata, its weighted value is 0, this program can be represented as $$C=(1,0,1,1,)$$

Then, a similarity matching is performed between the content information and the user profile, thereby obtaining the user's comprehensive interest degree of the program (step S320). A user profile may consist of m different user favor characteristics "term", the favor characteristic can be defined as a triplet ("term", weighted value, priority level), and then the profile can be represented as:

$$P=((t_1,w_1,1),(t_2,w_2,2), \ldots , (t_m,w_m,m)) \quad (2)$$

$$w_i \geq w_{i+1}(1 \leq i \leq m)$$

wherein $t_i$ is a favor characteristic "term", $w_i$ is a weighted value of "term" $t_i$, i is a priority level of $t_i$ in the profile. The weighted value and the priority level represent the degree of relatively importance of the "term" in the profile, for example, a user profile P has the following user favor characteristics:

$$P=((\text{movie}, 2.41, 1), (\text{war}, 1.80, 2), (\text{violence}, 1, 44, 3), (\text{sex}, 1. 28, 4), (\text{love}, 1. 12, 5)$$

For simplifying calculation, we take n "term" that best represents the users favor to construct the profiles, that is, taking n "term" with the maximum weighted value to construct profiles, then profile P may be represented by the following vector:

$$P=(w_1, \ldots W_n) \quad (3)$$

wherein $w_1$ is a weighted value of "term" $t_i$ in the profile. Supposing n=4, then profile P can be represented as:

$$p=(2.41, 1.80, 1.44, 1.28)$$

According to the traditional concept of a vector space, the similarity between the program information vector and the user favor vector refers to correlation between them. We can measure the degree of similarity by the weighted value between the corresponding "terms". Usually we take the cosine value of an angle between two vectors as a standard of measurement. Setting program information vector $C=(u_1, \ldots , u_n)$ and the user profile vector $P=(w_1, \ldots , w_n)$, the similarity between them can be obtained from the following equation:

$$sim(C, P) = \frac{C \times P}{\|C\| \times \|P\|} = \frac{\sum_{i=1}^{n} u_i w_i}{\sqrt{\sum_{i=1}^{n} u_i^2 \sum_{i=1}^{n} w_i^2}} \quad (4)$$

If program information vector C=(1, 0, 1, 1), favor profile vector P=(2.41, 1.80, 1.44, 1.28), then the similarity between them, i.e. the user's comprehensive degree of interest of the program is:

$$sim(C, P) = \frac{2.41 \times 1 + 1.44 \times 1 + 1.28 \times 1}{\sqrt{(2.41^2 + 1.80^2 + 1.44^2 + 1.28^2)(1^2 + 1^2 + 1^2)}} = 0.83 \quad (5)$$

After that, corresponding content alert processing is performed based on the above matching result (step S340). This step is to weight the comprehensive degree of interest by the comprehensive alert level γ, so that the comprehensive degree of interest can reflect more accurately the degree of how much the user is interested in the program. Supposing a comprehensive alert level γ=0.6, after being weighted, the comprehensive alert level

γ=0.83×0.6=0.498

Thus, the degree of the user's comprehensive degree of interest in the program is reduced after it is weighted by content alert. Details about how to employ comprehensive alert level to weight the comprehensive degree of interest will be given in the following text in conjunction with FIG. 4.

Next, the information that has been undergone with content alert processing is recommended to the user (step S360). A threshold value is set, and the program in which the user is interested is sieved via the threshold value. If the degree of the user's comprehensive interest in a certain program is greater than the threshold value, it is deemed that the user is interested in this program and the program will be selected. The greater the comprehensive degree of interest in the program is, the more interested the user is in the program. Then, an ordering is made according to the degree of interest in the program, thereby forming a recommendation list to recommend a program to the user.

Supposing the threshold value=0.6, since in step 340 the obtained comprehensive alert degree of interest 0.498<0.6, so the movie "Silent Lamb" that is meant to be recommended to the user will no longer be recommended to the user after alert processing.

The user's feedback information is received (step S380). The feedback information can be the time on which the user views the recommended content or other information that reflect the degree of the user's favor in the recommended program. The content of the feedback information can also be provided through viewing, deleting and skipping the recommended program by the user.

Finally, a user profile is updated according to the user's feedback information (step S390). The updating includes updating the favor characteristic "term" and its weighted value and priority level. As for the "term" contained in those files, their weighted values are modified based on the feedback result, according to equations (6) and (7):

$$w'_i = w_i + \beta \times f(i) \quad (6)$$

$$\beta = \frac{T_r}{T_t} \in [0, 1] \quad (7)$$

wherein $w'_i$ is a weighted value of "term" ti after the modification from the feedback;
$w_i$ is a weighted value of "term" ti before feedback;

β is a ratio between the time (Tr) on which the user watches the program and the time (Tt) of the program itself. β can be regarded as the degree of the user's interest in the recommended program.

f(i) is a reciprocal of the priority level of "term" ti in the profile, for example, if the priority level of ti is 4, then f(i)=f(4)=0.25, f(i) reflects the historical record of user's viewing.

As for those "term" not included in the profile, the processing mode is as follows:

First, calculating the weighted value of the t"term", $$w_i = \beta \times f(i) \quad (8)$$

wherein, $w_i$ is a weighted value of new "term" ti; the meaning of β is ditto.

Since "term" ti is not included in the profile, f(i) cannot be calculated according to the above method, but it can be defined as a default value ε (for example, $$\frac{1}{50} = 0.02))$$

Next, if $w_i$ that is obtained after calculation is greater than the preset threshold value λ (e.g. 0.01), we will add the "term" to the favor information in the user profile, otherwise ignore it.

Now a simple example is made: a program "Gone with the Wind" is recommended to the user. This program takes 180 minutes and contains a large number of "keywords", one of which is "marriage", the user changes the program after viewing 160 minutes, then the weighted value (WMarriage=1.44) of the corresponding favor characteristic "marriage" in the profile is modified as:

$$W'_{Marriage} = W_{Marriage} + \beta \times f(3) = 1.44 + 1 \times \frac{160}{180} \times \frac{1}{3} = 1.74$$

Figure 4:
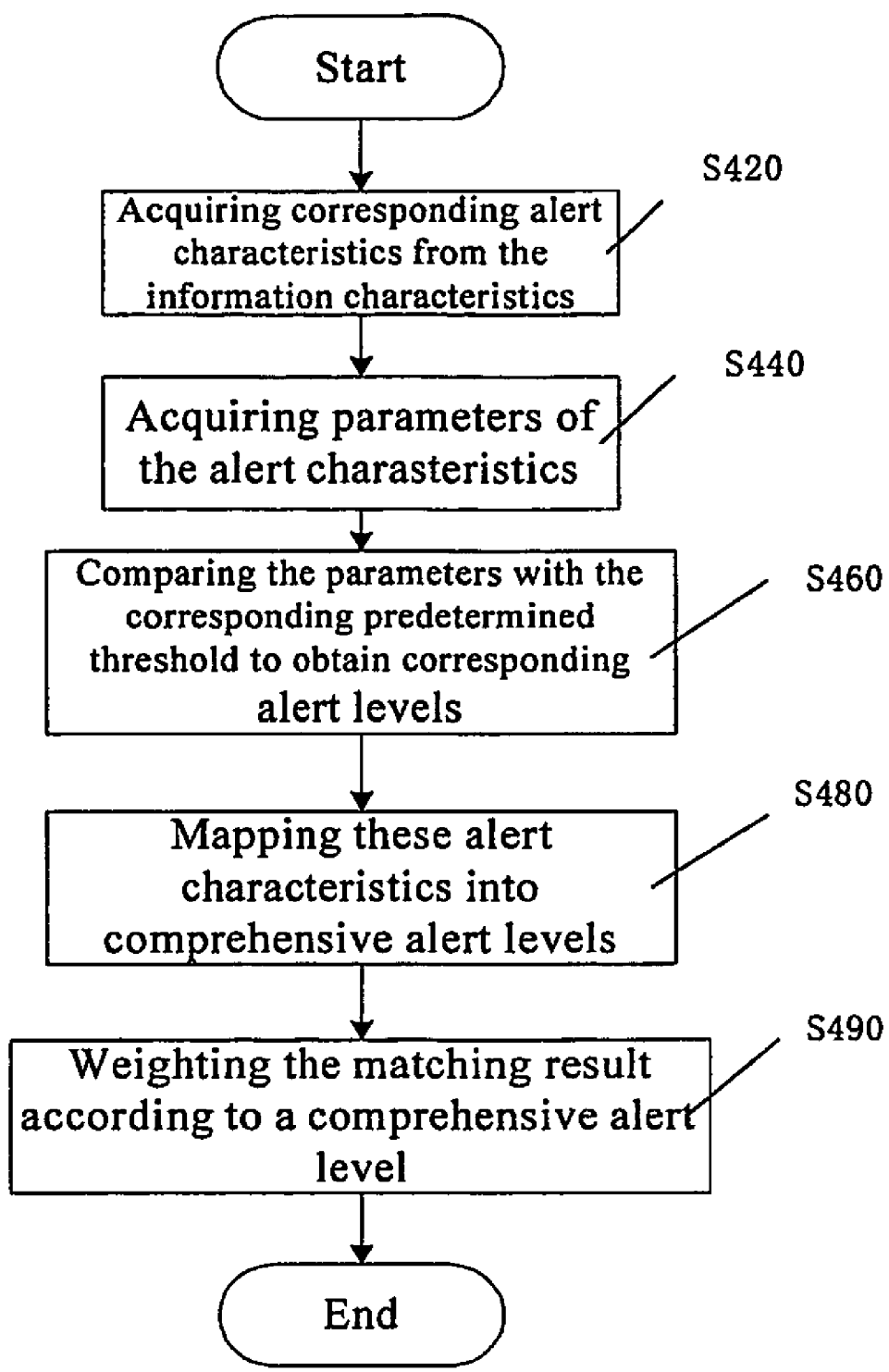
FIG. 4 is a flow chart of content alert processing according to an embodiment of the invention.

FIG. 4 is a flow chart of content alert processing according to an embodiment of the invention.

First, corresponding alert characteristic is obtained from the information characteristic (step S420). The alert characteristic can be, for example, MPAA classifies the movie and television programs by using an age index: G (general level), PG (viewing with parents guide as suggested), PG-13 (viewing with parents guide for children under 13 years old as suggested), R (restricted for viewing with adults guide), NG-17 (Children of 17 years old or less cannot view).

Also the alert characteristics can be other evaluable classification of alerts, for example, the following categories that are defined by TV-Anytime:
Sex (no, implied, revealed, adult restricted, violence);
Violence applied to human being (no, mild, strong, kill);
Violence applied to animals (no, mild, kill);
Violence applied to fictitious characters (no, mild, kill);
Vulgarity (no, occasional curse, frequency curse, occasionally severe curse, frequently severe curse);
Discrimination (no, on purpose);
Drug (no, description of usage, instructive details)

The above alert characteristics can be provided by a prior Genre Alert Spotting. The Genre Alert Spotting will obtain corresponding alert characteristics from the program content characteristics.

For example, the above description mentions that the metadata of the received program "Silent Lamb". This program has four information characteristics. When comparing with the preset alert characteristics, "violence" and "individuality" among them are alert characteristics.

Next, these alert features are mapped into parameters, for example, with values between 0 and 1 (step 440). For example, the violence (no, mild, strong, kill) exerted to human beings can be mapped into L1 (0, 0.3, 0.6, 1); sex (no, implied, revealed, restricted for adults, violence) can be mapped into L2=(0, 0.25, 0.5, 0.75, 1); age (G, PG, PG-13, R, NC-17) can be mapped into L3=(0, 0.25, 0.5, 0.75, 1) and so on.

Then, according to the above rule, the parameters of the alert characteristics of the movie "Silent Lamb" can be obtained:

$$L1=0.5, L2=0.6$$

Next, the above parameters are compared with corresponding threshold value respectively to obtain corresponding alert levels (step S460). If the parameters of the alert characteristics are greater than corresponding threshold value, an alert is triggered. Supposing the predetermined threshold value to which such an alert characteristic as sex corresponds T1=0.3, then an alert is triggered when L1>0.3. That is to say, sex (revealed) corresponding L1=0.5>0.3, an alert is triggered. Supposing the predetermined threshold value to which such an alert characteristic as violence (strong) corresponds T1=0.4, when L2=0.6>0.4, an alert will also be triggered to give a corresponding alert level.

The alert level can be obtained in this way: if L1<=Ti the output value is 0, indicating there is no alert; otherwise an alert is triggered, the alert level is Li-Ti. Before comparing the parameter with the predetermined threshold value, sensitivity (s1, s2, . . . ) can be set for the parameter L1 of different alert characteristics (age, sex, violence, etc.). The higher the sensitivity is, the higher the value of L2×S1 is, indicating that alert characteristics has greater influence on the recommendation. An option can be provided to make the user to adjust the sensitivity of the alert characteristics one by one, or make the user to adjust more easily the sensitivity of the alert characteristics through selecting the range of sensitivity. Hence, the alert levels triggered by the alert characteristics like "sex" and "violence" of the program are respectively as follows:

$$L1-T1=0.2, L2-T2=0.2$$

The predetermined threshold value can be determined by user, and for different alert characteristics different threshold values can be set.

Again, a comprehensive alert level is obtained according to these alert levels (step S480). An alert value is first obtained by combining all the alert levels linearly:

$$\text{Alert value} = \sum_i \max(0, L_i - T_i) \quad (9)$$

Then, the alert value is mapped between the range (0,1) as a comprehensive alert level of the program. Here, supposing 0=content restricted, 1=no alert, for example, mapping is made according to the following method:

$$\text{Comprehensive alert level } \gamma = 1 - \min(\text{alert value}, 1) \quad (10)$$

Whereby the alert value of "Silent Lamb"=max (0, 0.2)+max (0,0.2)=0.4,
Comprehensive alert level γ=1−min(0.4, 1)=0.6

If the comprehensive alert level of the program is closer to 0, it indicates that the program contains more alert characteristics, and more restriction is required; on the contrary, if the comprehensive alert characteristic of the program is closer to 1, it indicates that the program has less alert characteristics and less restriction is required.

Finally, weighting is made according to the matching result of the program content information and the user profile by the comprehensive alert level, i.e. a comprehensive degree of interest (Step S490). In this way, the comprehensive degree of interest can better reflect the user's real interest and the recommendation system can recommend more cautiously and accurately.

Figure 5:
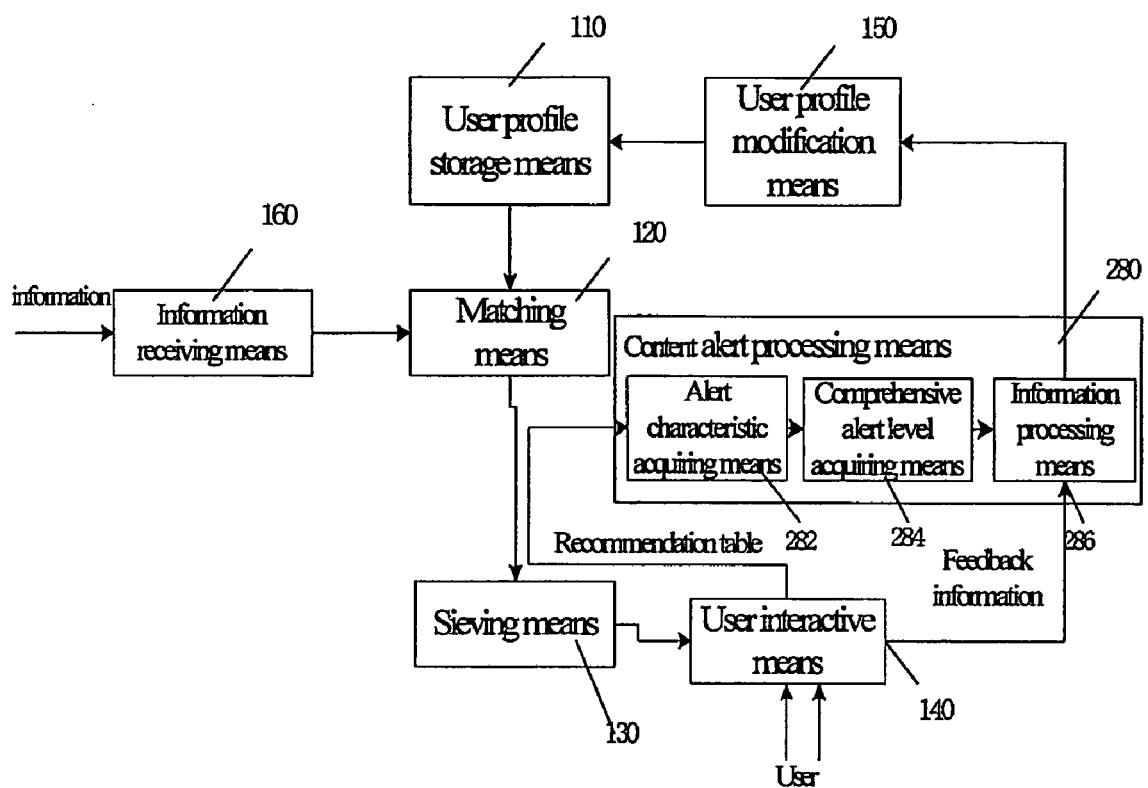
FIG. 5 is a structural diagram of a user profile update system according to another embodiment of the invention.

FIG. 5 is a structural diagram of a user profile updating system according to another embodiment of the invention. The user profile updating system comprises user interactive means 140, content alert processing means 280 and user profile modifying means 150.

The user interactive means 140 is used for obtaining information characteristics of the content information and the user's feedback information of the content information.

The content alert processing means 280 is used for performing content alert processing on the feedback information. The means further comprises: an alert characteristic acquiring means 282 for obtaining from the information characteristics the alert characteristics to which the content information corresponds; a comprehensive alert level acquiring means 284 for obtaining comprehensive alert level according to the alert characteristics; and information processing means 286 for processing the feedback information according to the comprehensive alert level.

The user profile updating means 150 is used for updating the user profile according to the feedback information that have been undergone with content alert processing.

Furthermore, the system includes an information receiving means 160, matching means 120, sieving means 130 and user profile storage means 110. The functions of these means are described in the explanation of FIG. 3 and will not be repeated here any more.

Figure 6:
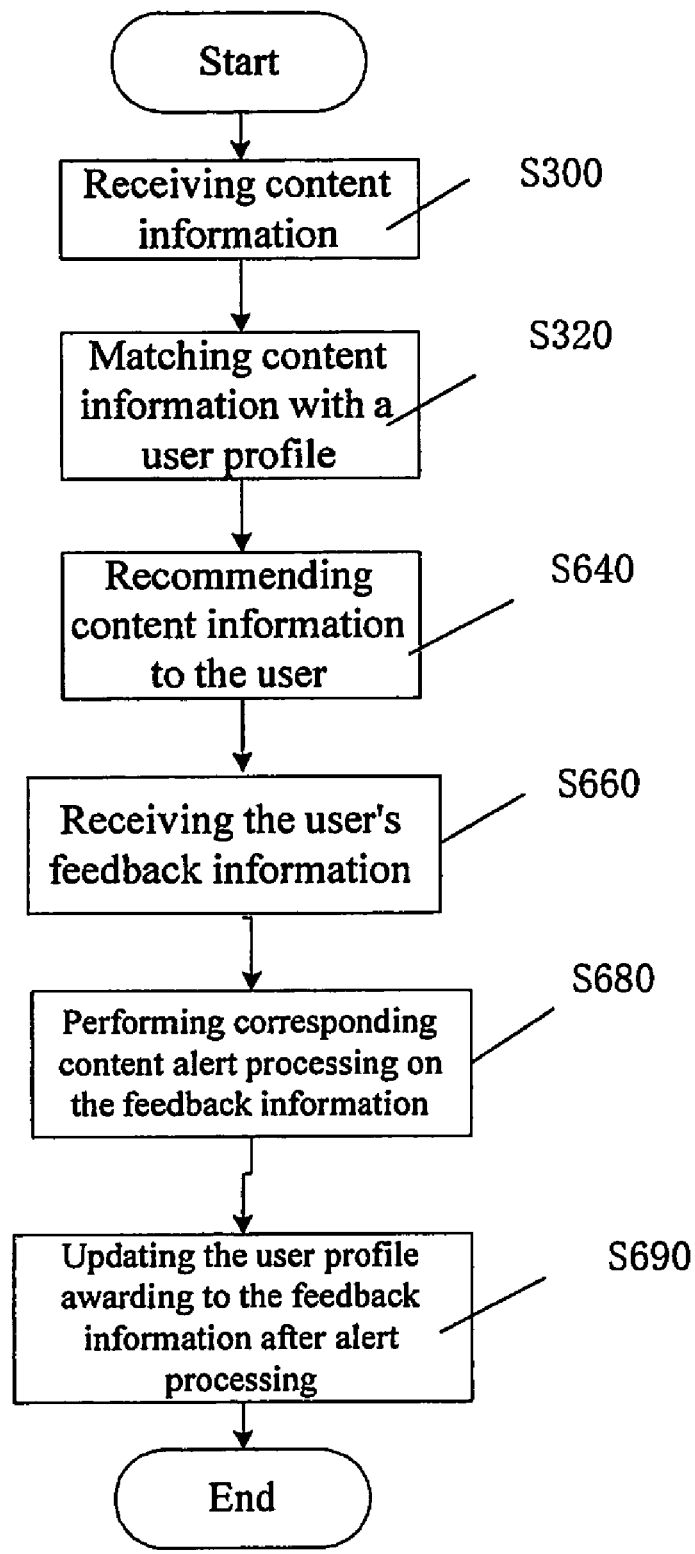
FIG. 6 is a flow chart of the user profile updating method according to another embodiment of the invention.

FIG. 6 is a flow chart of a user profile updating method according to an embodiment of the invention.

First, the content information is received (step S300).

Then, a similarity matching is performed between the content information and the user profile, thereby obtaining the user's comprehensive degree of interest of the program (step S320).

Next, the content in which the user is interested is sieved according to the degree of interest obtained after calculation and is recommended to the user (Step S640).

The user's feedback information is received (Step S660).

Corresponding content alert processing is performed on the feedback information (step S680). This step is similar to step S340, and the difference is, in step S340 the alert characteristics are program information from outside such as broadcasting, television or Internet, whereas the alert characteristics in step S680 are from the content information that is recommended to the user. In addition, in step S340, content alert weighting is performed on the matching result, whereas here content alert weighting is performed on the user's feedback information. In combination with FIG. 4, how to employ comprehensive alert levels to perform weighting has been described in detail.

Finally, the user profile is updated according to the feedback information that have been undergone with content alert processing (step S690). The weighted value of the favor characteristic "term" included in the user profile is modified according to equations (6') and (8'):

$$wl' \leftarrow wi + \beta \times \gamma \times f(i) \quad (6')$$

$$wj' = \beta \times \gamma \times f(i) \quad (8')$$

wherein $w'_i$ is a weighted value of "term" ti after feedback modification; $w_i$ is a weighted value of "term" ti before feedback; β is a ratio between the time (Tr) on which the user watches the program and the time (Tt) of the program itself. β can be regarded as the degree of the user's interest to the recommended program.

f(i) is a reciprocal of the priority level of "term" ti in the profile, for example, if the priority level of ti is 4, then f(i)=f(4)=0.25, f(i) reflects historical record of the user's viewing. ¥ refers to comprehensive alarm level.

The example mentioned in the previous text is still used as an example. A program "Gone with the Wind" is recommended to the user, this program takes 180 minutes and has an information characteristic "marriage", however, the user changes the program after viewing 160 minutes, and the comprehensive alert level of the program ¥=0.8, then the weighted value (WMarriage=1.44) of the corresponding favor characteristic "term" marriage in the profile is modified as:

$$W'_{Marriage} = W_{Marriage} + \beta \times \lambda \times f(3) = 1.44 + 1 \times 0.8 \times \frac{160}{180} \times \frac{1}{3} = 1.67$$

Through the above equation, the user's degree of favor of the characteristic "marriage" is modified. Compared with the situation without performing content alert processing, this weighted value is less, indicating that the user's degree of favor of the program will be reduced somewhat due to the presence of the alert characteristic in the program.

Above it is described that a content alert processing step is added before recommending to the user in the prior content recommendation method, or a content alert processing step is added after receiving the user's feedback information, so that the recommendation is more cautious and accurate. Certainly, the above two methods can be combined, that is, a content alert processing step is added before recommending to the user as well as after receiving the user's feedback information, so that not only the comprehensive degree of interest is much closer to the degree of user's actual interest in the program, but also the feedback information can better reflect the user's actual need and the recommendation is more cautious and accurate.

Although the description of the invention is made in combination with the specific embodiments, it will be obvious that those skilled in the art are able to make various alternations, modifications and changes based on the statement of context. Therefore, when such alternations, modifications and changes come within the scope of spirit and range of the appended claims, they shall be included in the invention.

What is claimed is:

1. A method for updating user profile of a user on an apparatus in the form of a broadcast data receiving means and television for receiving broadcast data and generating television programmes to be viewed on the television therefrom comprising:

using the broadcast data receiving means to obtain an information characteristic of content information from the broadcast data;

obtaining feedback information of said content information from the user via a communication device;

using a content-alert processing means to obtain an alert characteristic from the information characteristic;

determining the content-alert processing means a comprehensive alert level based on parameters of the alert characteristic;

weighting the feedback information by the comprehensive alert level; and updating said user profile held in storage means provided in the broadcast data receiver according to the weighted feedback information.

2. The method according to claim 1, wherein said information characteristic comprises a content characteristic and particular program information.

3. The method according to claim 2, wherein the particular program information is a key word in synopsis.

4. The method according to claim 1, wherein said alert characteristic comprises at least one of the following: age, sex, violence, vulgarity, discrimination and drug.

* * * * *